(12) United States Patent
Kogawa et al.

(10) Patent No.: US 6,639,392 B2
(45) Date of Patent: Oct. 28, 2003

(54) CHARGED PARTICLE MEASURING DEVICE AND MEASURING METHOD THEREOF

(75) Inventors: Nobuyoshi Kogawa, Tokyo (JP); Hiroshi Kitaguchi, Tokyo (JP); Tetsuya Matsui, Tokyo (JP); Akihisa Kaihara, Tokyo (JP); Junichi Arita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 30 days.

(21) Appl. No.: 10/084,068

(22) Filed: Feb. 28, 2002

(65) Prior Publication Data

US 2003/0030444 A1 Feb. 13, 2003

(30) Foreign Application Priority Data

Aug. 8, 2001 (JP) ......................................... 2001-240054

(51) Int. Cl.[7] .......................... G01N 27/00; G01N 27/62
(52) U.S. Cl. .................... 324/71.4; 324/71.1; 324/71.5; 324/464
(58) Field of Search ................................. 250/304, 306, 250/307, 308, 309, 310, 311, 440.11, 441.11, 442.11, 443.1; 324/409, 457, 458, 459, 461, 464, 501, 702, 71.1, 71.4, 71.5

(56) References Cited

U.S. PATENT DOCUMENTS 5,952,655 A  9/1999  Gross et al. ................. 250/304
6,333,504 B1 * 12/2001 Lingren et al. .......... 250/370.01
6,452,401 B1 *  9/2002 Derbyshire et al. .......... 324/464

FOREIGN PATENT DOCUMENTS

| JP | 58-175484 | 11/1983 |
| JP | 60-82285 | 6/1985 |
| JP | 60-83986 | 6/1985 |
| JP | 60-111248 | 7/1985 |
| JP | 64-10643 | 1/1989 |
| JP | 11-311677 | 11/1999 |

OTHER PUBLICATIONS

Electrical Material, Aug. 1988, pp. 91–96.

* cited by examiner

Primary Examiner—N. Le
Assistant Examiner—Donald M. Lair
(74) Attorney, Agent, or Firm—Crowell & Moring LLP

(57) ABSTRACT

A highly sensitive charged particle measuring device capable of measuring low-level alpha rays comprises in a measurement chamber 7 provided with a sealable door 15, a test sample 2 and a semiconductor detector 1, a radiation measuring circuit 30 including a preamplifier 30c connected to the semiconductor detector 1, a linear amplifier 30d, and a pulse height analyzer 30e, a charged particle emission amount arithmetic unit 40 for performing the quantitative analysis of charged particles from its measurement, a display unit for displaying its analysis result, and further has an evacuation pipe line and a pure gas supply pipe line for performing supply and replacement of the pure gas in the measuring chamber 7.

22 Claims, 10 Drawing Sheets

CHARGED PARTICLE MEASURING DEVICE AND MEASURING METHOD THEREOF

BACKGROUND OF THE INVENTION

1. Field of the Invention

The present invention relates to a charged particle measuring device and a measuring method for measuring charged particles such as low-level alpha rays, and in particular to a charged particle measuring device and measuring method suitable for the quantitative analysis of charged particles such as low-level alpha rays in various materials.

2. Description of the Related Art

Conventional art will be described in particular for the measurement of alpha rays among various types of charged particles.

As conventional technology, there is a gas flow-proportional counter type low-level alpha ray measuring device mentioned in "a super-low-level alpha ray measuring device", Electronic Material, August 1988, p. 91. This apparatus is a gas flow-proportional counter with a detection area of 1000 $cm^2$, and a detector where cathodes are arranged above and below a multiple wire type anodes disposed at the center. A test sample is directly put into the detector, and is placed closely to the lower side of a grid-like lower cathode. A counting gas is flown at a rate of about 200 ml per minute, the counting gas being a PR gas which is a mixed gas of argon and methane, and several thousands volts of DC voltage is applied to between the anodes and cathodes. When an alpha particle enters into the detector, the gas is ionized, and a short pulse current flows. Hence, the number of alpha particles is counted by converting this current into a voltage pulse and counting them.

In order to take countermeasures against problems such as a soft error phenomenon where stored charges in a semiconductor memory are reversed by alpha particles, the problem being caused by semiconductor memories becoming finer, it is important to perform a nuclide identification and low-level quantitative analysis of a disturbance alpha ray that a trace natural alpha emission element included in various material emits.

Although it can easily measure a sample with a large area, the above-described conventional gas flow-proportional counter type low-level alpha ray measuring device needs to apply several thousands volts of DC voltage to between the anodes and cathodes of the detector, and needs to perform measurement while flowing PR gas as the counting gas. Hence, the apparatus becomes large in size.

In addition, in the performance of alpha ray analysis, there are major defects that energy resolution is inferior, that discriminating measurement of an alpha ray nuclide is not possible, and that a background discrete value cannot be made small, and hence, lower-level alpha ray measurement cannot be performed.

SUMMARY OF THE INVENTION

A first object of the present invention is to provide a charged particle measuring device with high sensitivity that can efficiently measure charged particles such as a low-level alpha ray whose nuclide is identified, and a measuring method thereof.

A second object of the present invention is to provide a charged particle measuring device that can realize the measurement of charged particles such as a lower-level alpha ray, and a measuring method thereof.

A third object of the present invention is to provide a charged particle measuring device which can reduce the background discrete value, and a measuring method thereof.

A fourth object of the present invention is to provide a charged particle measuring device which is not a large-scale apparatus, but can realize the measurement of charged particles such as a lower-level alpha ray, and a measuring method thereof.

To achieve the above-described objects, a charged particle measuring device according to the present invention is characterized in comprising a measuring chamber having a sealing door which can be opened and closed, the measuring chamber comprising: a semiconductor detector; a radiation measuring circuit including a sample tray on which a measurement sample is placed so as to oppose to the semiconductor detector, a preamplifier, a linear amplifier, and a pulse height analyzer connected to the semiconductor detector; a charged particle emission amount arithmetic unit for performing the quantitative analysis of charged particles with an output signal from the radiation measuring circuit; a display unit for displaying the analysis result of the charged particle emission amount arithmetic unit; and including: an evacuation pipe line for discharging air to the measuring chamber; and a pure gas supply pipe line for performing the supply and replacement of a pure gas.

In addition, a charged particle measuring device according to the present invention is characterized in comprising a measuring chamber, the measuring chamber comprising: a semiconductor detector; a measurement sample placed so as to oppose to the semiconductor detector; a radiation measuring circuit which includes a shield shutter that is arranged between the semiconductor detector and the sample and shields charged particles entering from the sample at the time of background measurement, and is connected to the semiconductor detector to perform spectrum analysis; a charged particle emission amount measuring device which performs the quantitative analysis of charged particles with an output signal of the radiation measuring circuit; a display unit for displaying the analysis result of the charged particle emission amount measuring device, and including an evacuation apparatus and a gas replacement apparatus, which are connected through an exhaust pipe which communicates with the measuring chamber.

Furthermore, a charged particle measuring method according to the present invention is characterized in comprising the steps of: arranging a sample tray on which a test sample is placed so as to oppose to a semiconductor detector in a measuring chamber having a sealable door which can be opened and closed; performing cycle purge for a predetermined number of times with a pure gas by an evacuation apparatus and a gas replacement apparatus which are connected through an exhaust pipe which communicates with the inside of the measuring chamber, and thereafter measuring a charged particle emission amount by a radiation measuring circuit which includes a preamplifier, a linear amplifier, and a pulse height analyzer that are connected to the semiconductor detector, and a charged particle emission amount arithmetic unit for performing quantitative analysis of charged particle with an output signal from the radiation measuring circuit, and setting the charged particle emission amount as a background measurement; and calculating a charged particle emission amount value which is obtained by subtracting the background measurement from a measurement of the charged particle emission amount obtained by measuring a charged particle emission amount after placing the sample on the sample tray and performing cycle purge for a predetermined number of times with a pure gas.

Moreover, a charged particle measuring method according to the present invention is characterized in comprising the steps of: arranging a measurement sample so as to oppose to a semiconductor detector in a measuring chamber; shielding charged particles entering from the measurement sample by a shield shutter between the semiconductor detector and the sample; performing cycle purge for a predetermined number of times with a pure gas by an evacuation apparatus and a gas replacement apparatus which are connected through an exhaust pipe communicating with the inside of the measuring chamber, and thereafter measuring a charged particle emission amount by a radiation measuring circuit which is connected with the semiconductor detector and performs spectrum analysis, and a charged particle emission amount measuring device which performs the quantitative analysis of charged particles with an output signal of the radiation measuring circuit, and setting the charged particle emission amount as a background measurement; and calculating a charged particle emission amount value which is obtained by subtracting the background measurement from a measurement of the charged particle emission amount obtained by measuring a charged particle emission amount entering from the sample, by opening the shield shutter.

DETAILED DESCRIPTION OF THE PREFERRED EMBODIMENTS

Figure 1:
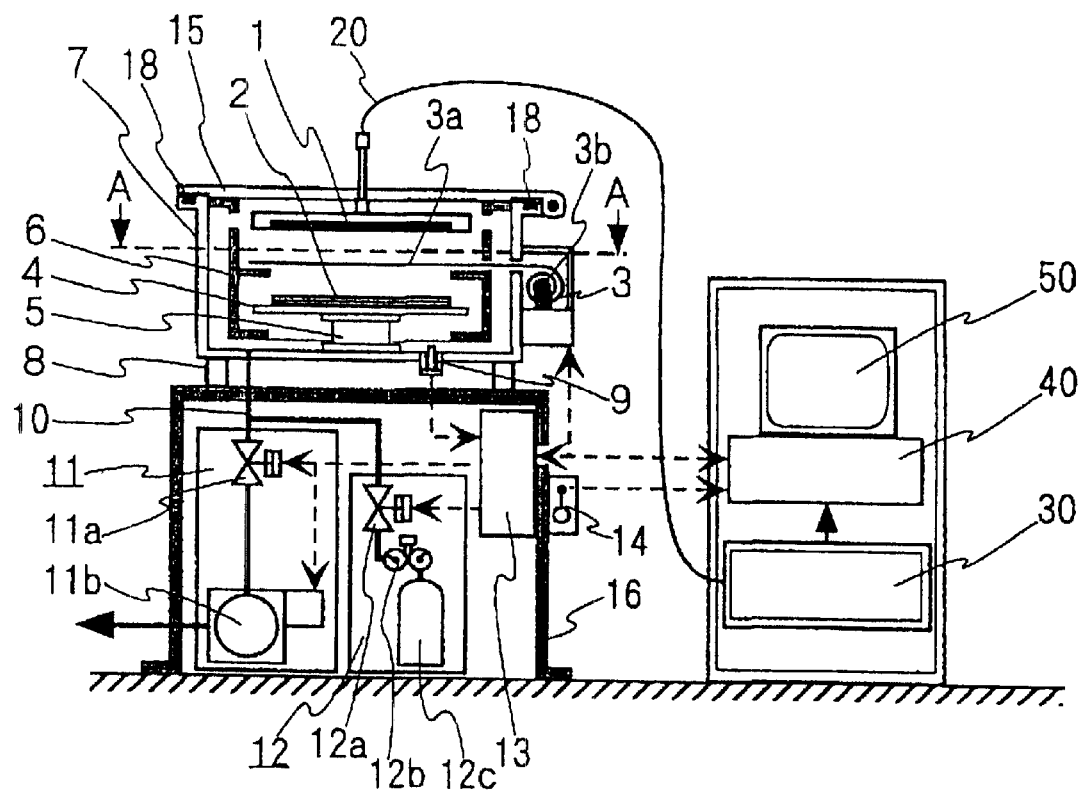
FIG. 1 is a structural diagram of a low-level alpha ray measuring device according to one embodiment of the present invention.

Hereafter, taking an alpha ray as charged particles, an embodiment of the present invention will be described with reference to FIGS. 1 to 14. FIG. 1 is a structural diagram of a low-level alpha ray measuring device according to this embodiment. In the upper area inside a measuring chamber 7 (also called a measurement housing 7), a flat-plate type semiconductor detector 1 which detects a low-level alpha ray is fixedly provided on a sealable door 15 described later, and a signal line 20 of the semiconductor detector 1 is taken out from the upper part of the measuring chamber 7. A measurement sample 2 is set so as to oppose to the semiconductor detector 1 on a sample tray 4 on an elevating device 5 in the measuring chamber 7 by opening and closing the sealable door 15, and the distance between the sample 2 and semiconductor detector 1 is adjusted by raising and lowering the elevating device 5. An O-ring groove is provided in a flange of the measuring chamber 7, and contact surfaces of an O-ring 18, fit into this O-ring groove, and the sealable door 15 are mirror-finished.

An automatic open/close type shield shutter 3 for shielding alpha rays incident from the sample 2 at the time of background measurement is provided between the semiconductor detector 1 and the sample 2. In order to shield disturbance alpha rays incident from an inside wall of the measuring chamber 7 etc., a shield wall 6 is provided so as to surround the circumference of the semiconductor detector 1 and the sample 2. This shield wall 6 is for shielding disturbance alpha rays incident from faces other than faces of the sample.

Figure 2:
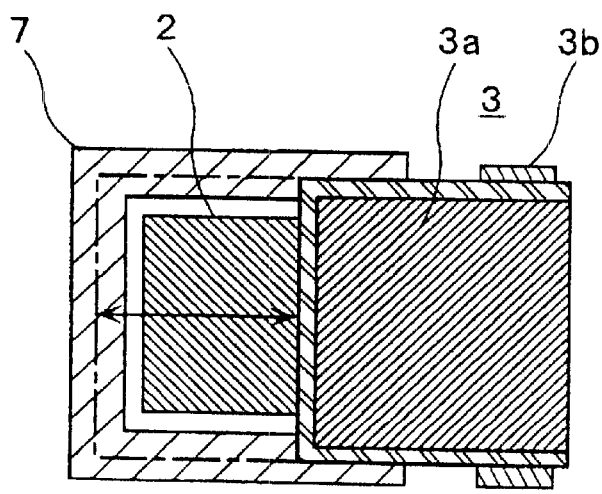
FIG. 2 is a sectional view taken on line A—A in FIG. 1 and shows the detail of an automatic open/close type shield shutter.

FIG. 2 is a detailed drawing of the automatic open/close type shield shutter 3. The shield shutter 3 comprises a shield sheet 3a and a shutter mechanism 3b. Although an aluminum foil having a thickness in the order of 10 $\mu$m can shield an alpha ray sufficiently, in consideration of durability, for example, an aluminum sheet having a thickness of about 100 $\mu$m is used as the shield sheet 3a. As for the movable range of the shield shutter 3 that is shown by an arrow in FIG. 2, a stroke is set so as to be able to fully close the sample 2 at the time of background measurement and to be able to fully open the sample 2 at the time of sample measurement. Moreover, it is possible to reduce the influence of disturbance radiations such as cosmic rays by using stainless steel material and the like having good processability for the inside of the measuring chamber 7, and making the outside of the measuring chamber 7 double structure (not shown) with a shielding material such as lead with a thickness of several centimeters. It is possible to lower the minimum value that can be measured by adopting such constitution.

An exhaust pipe 10 is provided in the lower area of the measuring chamber 7, and this exhaust pipe 10 branches into two exhaust pipes. One is connected to an evacuation apparatus 11, and another is connected to a gas replacement apparatus 12.

The evacuation apparatus 11 is for exhausting gases in the measuring chamber 7 and measuring the alpha ray under decompression in order to prevent attenuation of the alpha ray caused by the gases that exist between the semiconductor detector 1 and the sample 2. The evacuation apparatus 11 comprises an electromagnetic gate valve 11a and a vacuum pump 11b, and the vacuum pump 11b is connected to the exhaust pipe 10 through the electromagnetic gate valve 11a.

The gas replacement apparatus 12 is for replacing the environment of the measuring chamber 7 by a pure gas, i.e., a gas that does not include a radioactive gas, and comprises an electromagnetic gate valve 12a, a pressure regulator 12b, and a chemical cylinder 12c for replacement. The chemical cylinder 12c for replacement is connected to the exhaust pipe 10 through the electromagnetic gate valve 12a and pressure regulator 12b. Besides nitrogen gas, any gas so long as it is a pure gas that does not include a radioactive gas, can be used as the gas.

Since radon (abbreviation: Rn) which is a decay product of uranium and thoron (abbreviation: Tn) that is a decay product of thorium are included in air, alpha rays emitted from the radon and thoron become strong disturbance radiations. By the gas replacement apparatus 12 making replacement gas flow into the measuring chamber 7, a small amount of air that remains in the measuring chamber 7 can be discharged by the evacuation apparatus 11, and the radon and thoron can be discharged from the measuring chamber 7 by replacing air with a pure gas such as a nitrogen gas.

Thus, by activating a vacuum pump and evacuating the air inside a measurement housing to replace it with pure gas, it is possible to remove the disturbance radiations in the air.

A shock absorber 8 for intercepting vibration is provided between the measuring chamber 7 and a frame 16 to prevent microphonic noise that the semiconductor detector 1 receives by vibration. Moreover, it is desirable that the exhaust pipe 10 is a tube such as a flexible tube with little propagation of vibration, and owing to this, it is possible to prevent vibration such as an earthquake from transmitting through the exhaust pipe 10, causing signal noise. A vibration monitor 14 that monitors vibration in order to differentiate a usual signal from noise caused by vibration is disposed at a location where the vibration of the measuring chamber 7 can be measured, for example, in the measuring chamber or the frame 16. Even if vibration is prevented by the shock absorber 8 or the exhaust pipe 10 formed of a flexible tube, there is a possibility that the generation of noise cannot be prevented when strong vibration arises. Hence, when a signal detected by the vibration monitor 14 exceeds a threshold, the measurement data in a time zone when the signal exceeds the threshold is excluded.

In this manner, since the transmission to the measurement housing from a frame is blocked by the shock absorber, it is possible to prevent microphonic noise by vibration that a semiconductor detector receives. In addition, since the processing of automatically removing measurement data in the time zone when vibration monitored by the vibration monitor exceeds a threshold is performed, it is possible to acquire data while removing noise caused by strong vibration.

Moreover, an automatic controller 13 is installed in the frame 16, and this controller 13 automatically controls the electromagnetic gate valves 11a and 12a, vacuum pump 11b, vacuum level monitor 9, and shield shutter 3.

The signal detected by the semiconductor detector 1 is inputted into a radiation measuring circuit 30 through a signal line 20, and is given spectrum analysis by the radiation measuring circuit 30, and then given data processing by an alpha ray emission amount arithmetic unit 40. The processing result is displayed by a display unit 50.

Figure 3:
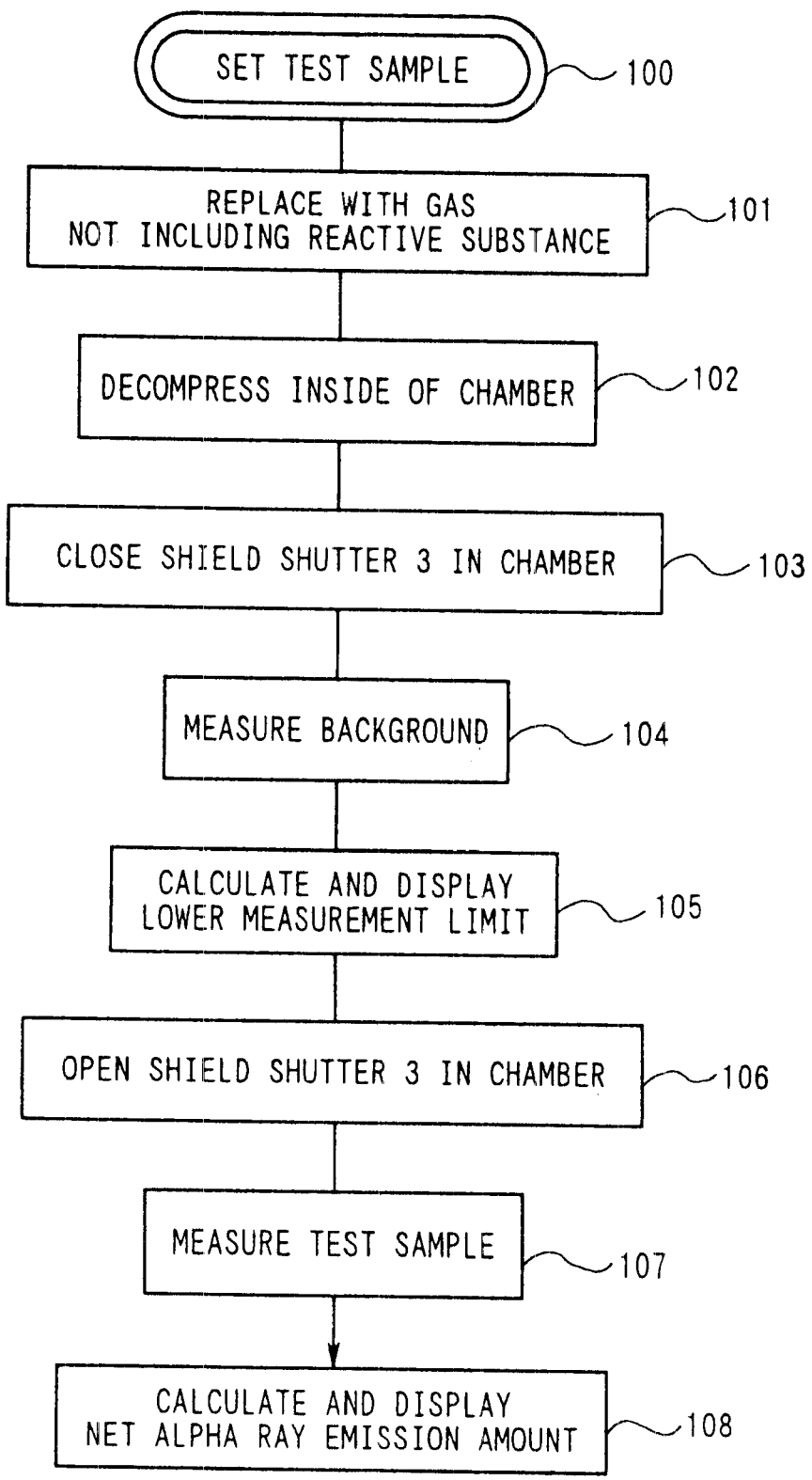
FIG. 3 is a schematic measurement flow chart at the time when low-level alpha ray measurement is fully automated.

The outline of a measurement flow in the case where low-level alpha ray measurement is fully automated will be described with reference to FIG. 3. At step 100, the sample 2 to be measured is set in the measuring chamber 7. At step 101, air in the measuring chamber 7 is replaced by a pure gas in order to exhaust disturbance nuclides included in the air in the measuring chamber 7. At step 102, the inside of the measuring chamber 7 is decompressed in order to suppress the decay of alpha rays with gases, the shield shutter 3 in a chamber 7 is closed at step 103, and background measurement is performed at step 104. After the completion of the background measurement, at step 105, a lower measurement limit is calculated and the result is displayed. At step 106, the shield shutter 3 in the measuring chamber 7 is opened, at step 107, the alpha ray measurement of the sample is performed, and a net alpha ray emission amount is calculated by subtracting the background measurement from the alpha ray measurement, and its result is displayed at step 108.

Figure 4:
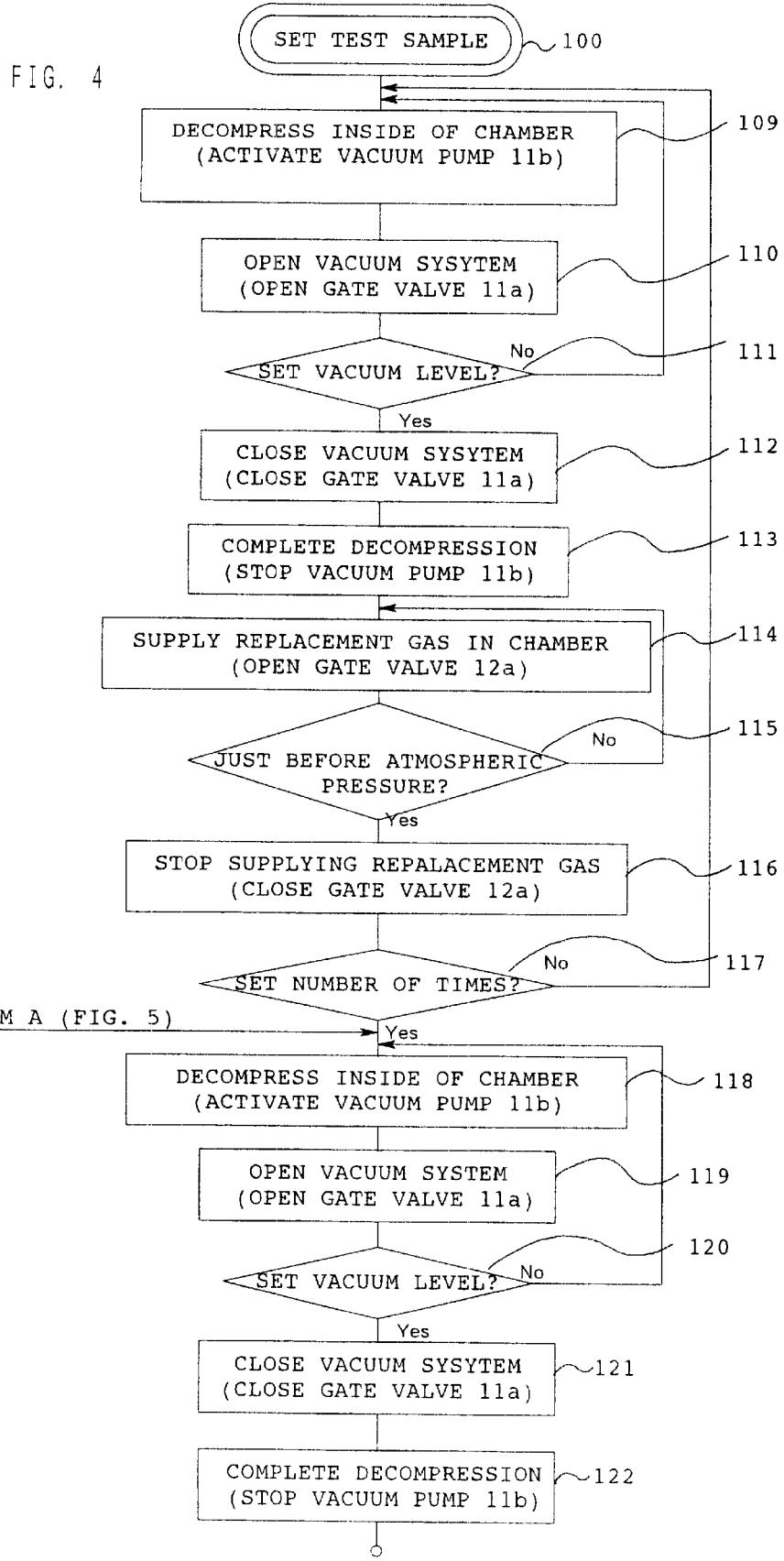
FIG. 4 is a measurement flow chart of gas replacement and decompression operation.

Next, the detail of the gas replacement at step 101, and the decompressing operation at step 102 of FIG. 3 will be described with reference to FIG. 4. At step 100, the measuring chamber 7 is opened and the measurement sample 2 is set on the sample tray 4. The sealable door 15 of the measuring chamber 7 is airtightly sealed, and the vacuum pump 11b is activated at step 109. The electromagnetic gate valve 11a is opened at step 110 to evacuate air in the measuring chamber 7. At step 111, the degree of vacuum is monitored by the vacuum level monitor 9, and if a set degree of vacuum is reached, the electromagnetic gate valve 11a is shut at step 112. Then, the vacuum pump 11b is stopped at step 113.

The electromagnetic gate valve 12a is opened at step 114. The source pressure of the chemical cylinder 12c is decompressed by the pressure regulator 12b for performing preset so that the exit pressure (or secondary pressure) of the pressure regulator 12b may become nearly 80 to 90 kPa that is lower than atmospheric pressure. A replacement gas flows into the measuring chamber 7, and at step 115, before the measuring chamber 7 reaches atmospheric pressure, the electromagnetic gate valve 12a is closed to stop the inflow of the replacement gas (step 116). The reason why the electromagnetic gate valve 12a is closed to stop the inflow of the replacement gas before reaching atmospheric pressure is because the emission of the replacement gas may arise if the pressure of the replacement gas reaches the atmospheric pressure, and there arises a possibility that radon and thoron may invade if air mixes in.

At step 117, it is determined whether the number of times of pure gas replacement operation is equal to the set number of times, and if it is fewer than the set number of times, the vacuum pump 11b in a vacuum system is operated again, and operation at steps 109 to 116 are executed. If the set number of times is reached, the vacuum pump 11b is activated at step 118. The electromagnetic gate valve 11a is opened at step 119 to evacuate air in the measuring chamber 7. At step 120, the degree of vacuum is monitored by the vacuum level monitor 9, and if a set degree of vacuum is reached, the electromagnetic gate valve 11a is shut at step 121. Then, the vacuum pump 11b is stopped at step 122. This replacement operation is repeated for an appropriate number of times depending on necessity, for example, three to four times. In addition, if the pure gas can replace the air by one operation, the number of times can be set to one. After the environment of the measuring chamber 7 is replaced by the pure gas and reaches the set degree of vacuum, the process moves to background measurement operation at step 104, and sample measurement operation at step 107 of FIG. 3.

Figure 5:
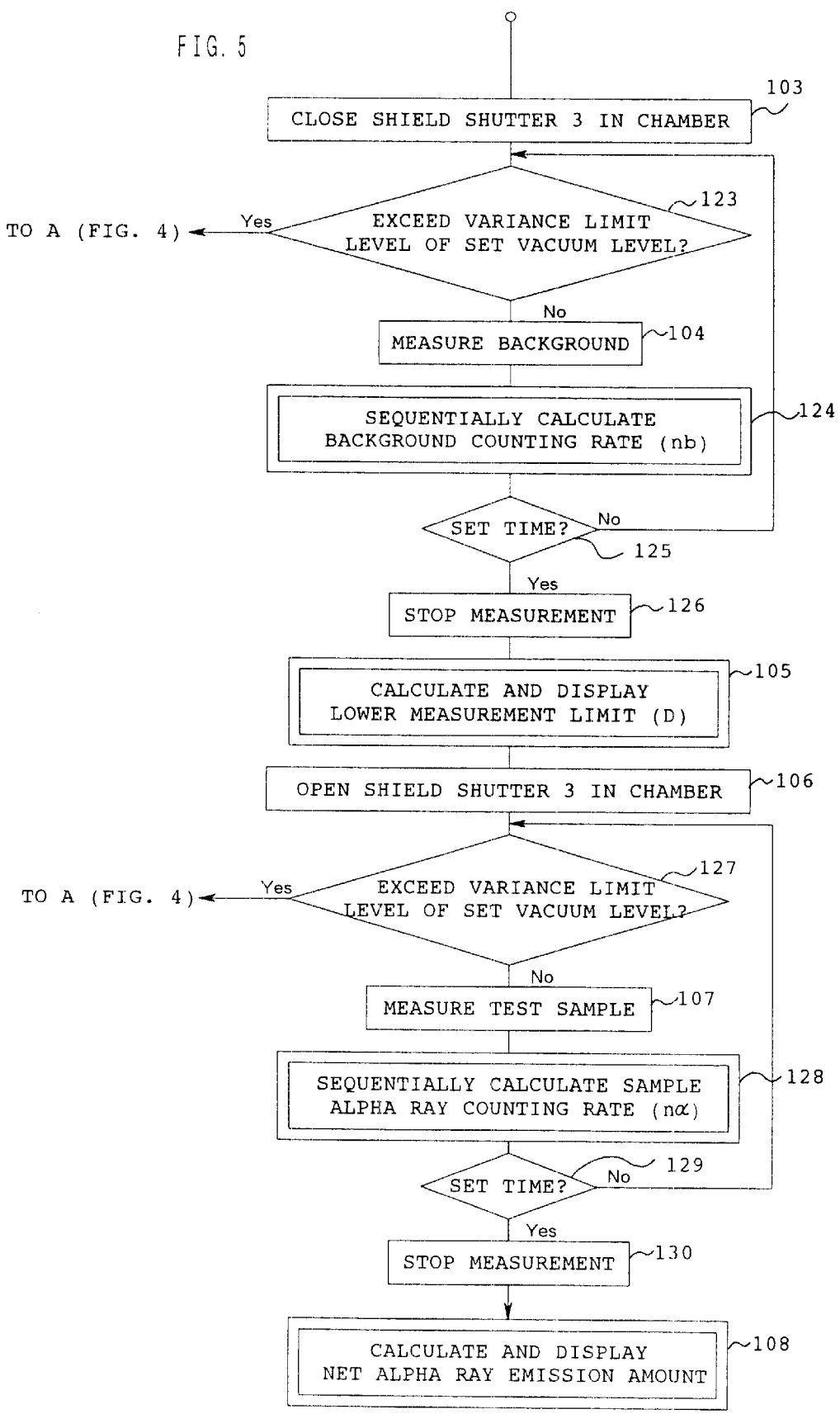
FIG. 5 is a measurement flow chart of background measurement operation and sample measurement operation.

The detail of background measurement operation and sample measurement operation will be described with reference to FIG. 5. After the environment of the measuring chamber 7 is replaced by the pure gas and reaches the set degree of vacuum, the shield shutter 3 arranged below the semiconductor detector 1 is closed at step 103, and background measurement operation is begun while shielding the alpha rays from the sample 2.

Figure 6:
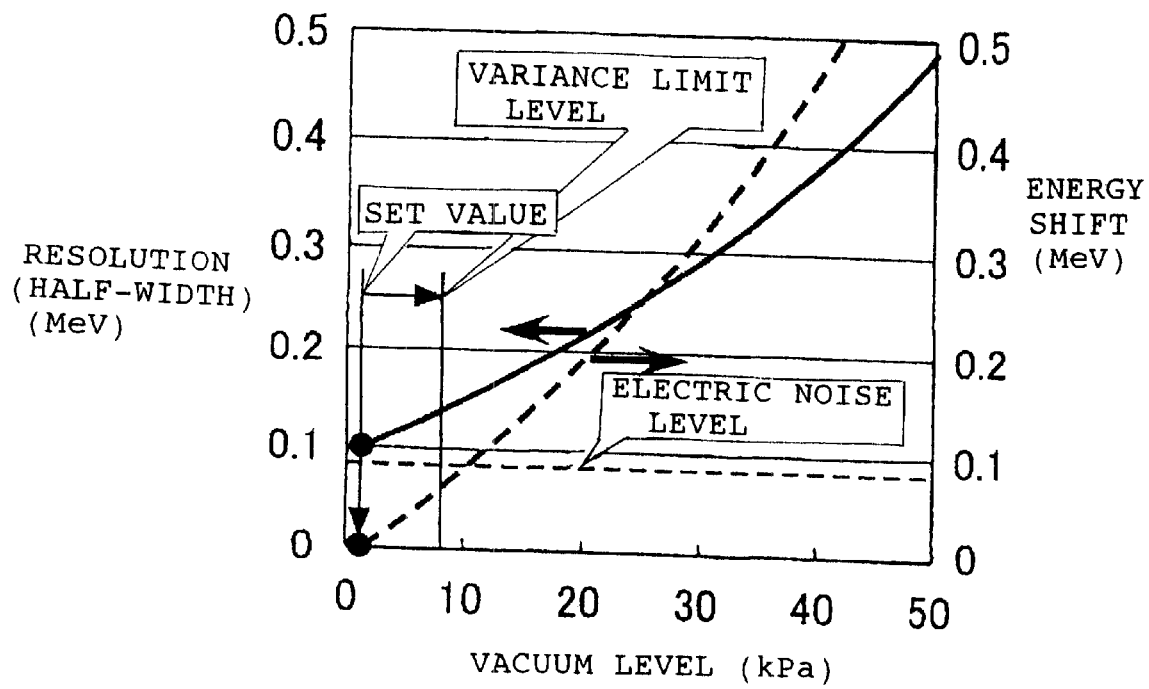
FIG. 6 is a graph showing the relation between the alpha ray energy resolution, the total absorption peak value shift, and the degree of vacuum.

Although described in detail by reference to FIG. 6, the degree of vacuum is monitored by the vacuum level monitor 9 at step 123 since the deterioration of energy resolution and the shift of a total absorption peak value arise if the degree of vacuum drops. Although described in detail with reference to FIG. 7, since a counting rate is high just after measurement starts experientially, until time in the order of 10 hours passes, a counting rate is sequentially calculated at step 124 and data after the drop of the counting rate to an average level is adopted.

In this manner, since a degree of vacuum is monitored by a vacuum level monitor and measurement data during the time when the degree of vacuum exceeds a variance limit level is automatically removed, it is possible to enhance alpha ray energy resolution and to acquire the data with a small shift amount of total absorption peak values (energy) of alpha rays.

Background measurement time is set to the time satisfying the lower alpha ray measurement limit being the target. Actually, a lower alpha ray measurement limit D (C/cm$^2$·h) is calculated from formula 1.

[Formula 1]

$$D=3\cdot(2\cdot nb/tb)^{1/2}/(\tau \cdot Ad) \quad (1)$$

Here, nb denotes a background counting rate (cph), tb is a background measuring time (h), $\tau$ is a detection efficiency, and Ad is an area of a detecting element (cm$^2$).

When it is determined at step 125 that the background measuring time reaches the set time, measurement is stopped at step 126, and a lower measurement limit is calculated and displayed by the alpha ray emission amount arithmetic unit 40 at step 105. When the background measurement is completed, the shield shutter 3 arranged below the semiconductor detector 1 is fully opened at step 106, and the process moves on to sample measurement operation to measure alpha rays from the sample 2.

The degree of vacuum is monitored by the vacuum level monitor 9 at step 127 since the deterioration of energy resolution and the shift of a total absorption peak value occur if the degree of vacuum falls. The time determined by an alpha ray counting rate from the sample 2 is set as the measuring time of the sample 2 at step 128. Generally, if the measured value of the sample is practically equal to that of the background, the measuring time is set equally to the background measuring time. When it is determined at step 129 that the set time is reached, the measurement is stopped at step 130, an alpha ray emission amount is calculated by the alpha ray emission amount arithmetic unit 40 at step 108, and the net alpha ray emission amount obtained by subtracting the background value is calculated. The net alpha ray emission amount C$\alpha$ (C/cm$^2$·h) is defined as a value calculated from formula 2.

[Formula 2]

$$C\alpha=(n\alpha-nb)/(\tau \cdot As) \quad (2)$$

Here, n$\alpha$ denotes an alpha ray counting rate (cph) of the sample, and nb is a background counting rate (cph), $\tau$ is a detection efficiency, and As is a sample area (cm$^2$).

The degree of vacuum set at the above-described steps 111, 123, and 127 is set at about 1 kPa that belongs to a low vacuum region, i.e., 10 Torr. This is because, as shows in the first vertical axis of FIG. 6, the higher the degree of vacuum becomes, the better the alpha ray energy resolution becomes. Here, a smaller value represents a higher grade of vacuum. On the other hand, since there is a certain electrical noise component in a measurement system, for example, there is about 80% (0.08 MeV) of electrical noise component in an example shown in FIG. 6, the effect of resolution enhancement being low even if the level of vacuum is increased further. For this reason, in the example shown in FIG. 6, the pressure of about 1 kPa that belongs to a low vacuum region is suitable. In addition, as shown in the vertical secondary axis in FIG. 6, since the shift amount of a total absorption peak value (energy shift) of an alpha ray becomes large as the degree of vacuum becomes low (a larger value means a lower grade of vacuum), it becomes important to maintain the degree of vacuum at a set value also in prolonged measurement. Since the contact surface of the sealable door 15 with the O-ring 18 is mirror-finished, leak can be suppressed to a small volume even if a long time passes after evacuation stop. In addition, when the leak amount increases and a measurement of the vacuum level monitor 9 exceeds a variance limit level, for example, 9 kPa, exclusion processing of the measurement data during the time after exceeding the variance limit level is performed. If the measuring time runs short as a result of exclusion processing, data accumulation is performed again after performing evacuation and returning to a set degree of vacuum. This data processing is performed by, for example, the alpha ray emission amount arithmetic unit 40. Owing to the adoption of this method, the reliability of data is sharply securable.

Figure 7:
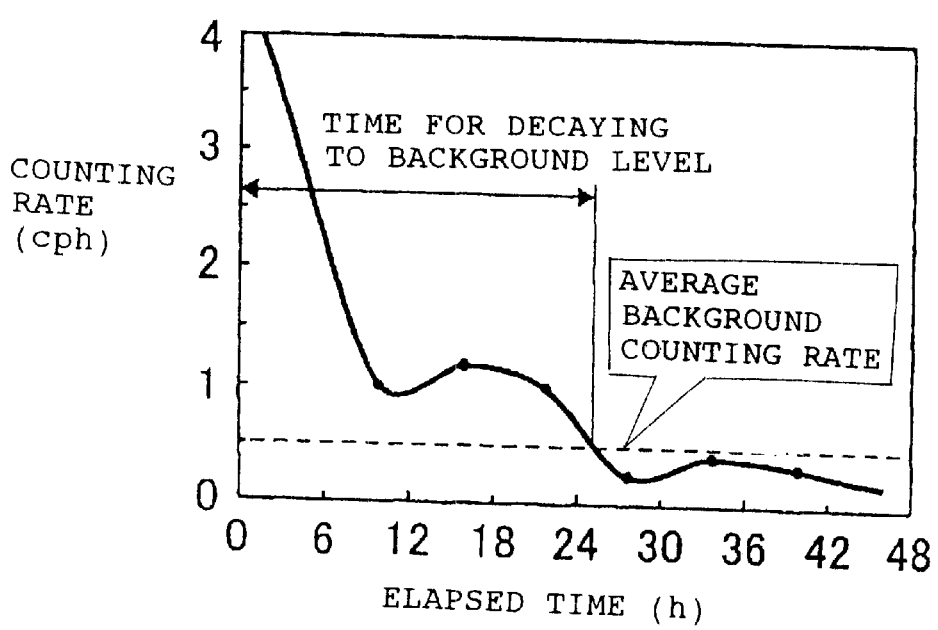
FIG. 7 is a graph showing the time-dependent change of the background measurement.

The time-dependent change of the counting rate at the start of the measurement while setting the range of measurement energy to 5.5 to 10 MeV is shown in FIG. 7. As seen from the result shown in FIG. 7, the counting rate is high at the beginning of a measurement and when about 25 hours passes, the counting rate drops to an average level, i.e., an average counting rate level of the background. When performing sample measurement immediately after performing gas replacement, the same time-dependent change is shown. This can be considered to be the influence of alpha rays emitted by decay products of radon and thoron that remain slightly in the measuring chamber 7. From this result, the sequence adopting the measurement data after time in the order of ten hours had passed when the counting rate becomes an average counting rate level, and automatically starting measurement after preset time elapses after the gas replacement becomes effective.

According to this embodiment, it is possible to realize 10$^{-3}$ (C/cm$^2$·h) order of low-level alpha ray measurement that has not been realized up to now. Moreover, a 0.001 to 0.0001 (C/cm$^2$·h) level or lower alpha ray measurement can be realized, and such a low-level alpha ray measurement is called super low-level alpha ray measurement for convenience.

Figure 8:
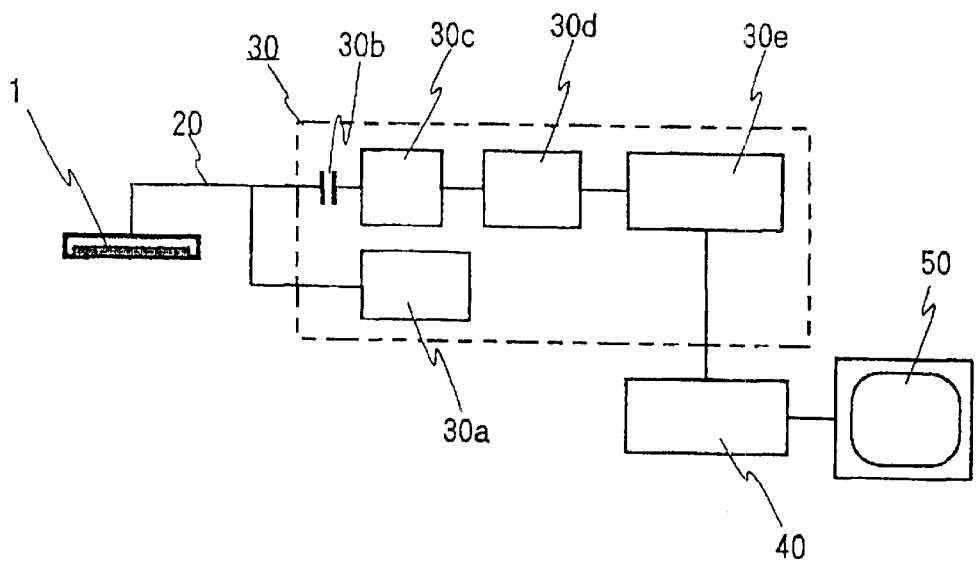
FIG. 8 is a structural diagram of a radiation measuring circuit for a semiconductor detector according to this embodiment.

Next, the configuration of the radiation measuring circuit 30 connected to the signal line 20 of the semiconductor detector 1 will be described with reference to FIG. 8.

In the subsequent stage of the signal line 20 of the semiconductor detector 1 to which a bias voltage is applied by a bias power supply 30a, a coupling capacitor 30b for reliable charge collection, a preamplifier 30c, and a linear amplifiers 30d for pulse shaping matching for pulse height analysis are provided, and pulse height is measured by a pulse height analyzer 30e that is subsequent to the linear amplifier 30d. Alpha rays in an object energy range from the result of the pulse height analysis is identified, the quantitative analysis of the alpha ray emission amount is performed by the alpha ray emission amount arithmetic unit 40, and its result is displayed on the display unit 50. The alpha ray emission amount arithmetic unit 40 monitors vibration with the vibration monitor 14, and also excludes noise signal generated by an earthquake etc.

Figure 9:
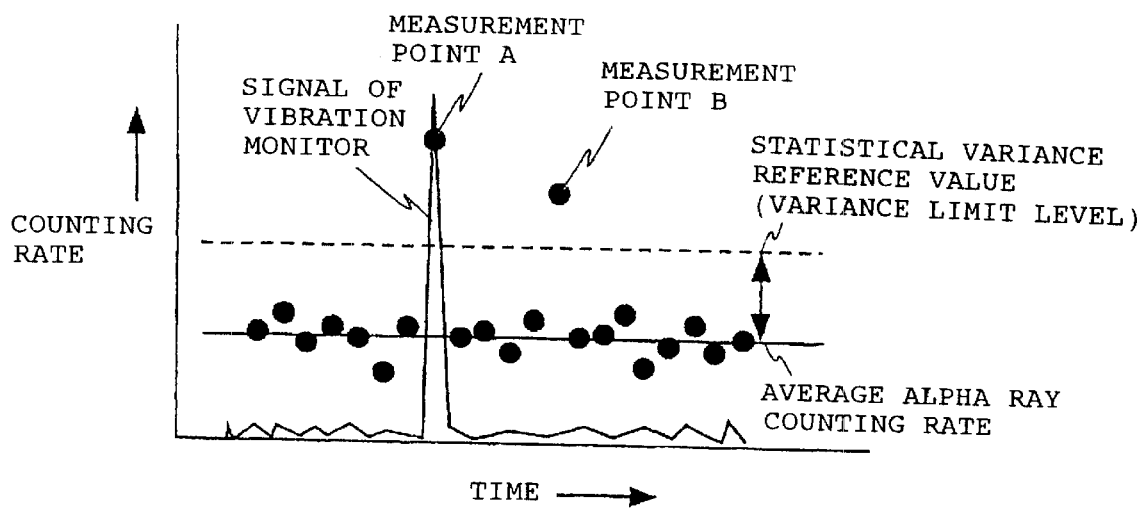
FIG. 9 is a graph showing the trend data of alpha ray measurement.

FIG. 9 shows the trend data of alpha ray measurement taking time as the horizontal axis and taking the counting rate of alpha rays as the vertical axis. Since a measuring point A shown in FIG. 9 is generated at the same time as when a signal of the vibration monitor 14 becomes high, which is the noise caused by strong vibration such as an earthquake, the data at the measuring point A is excluded from measurement data. In addition, it is determined that a measuring point B is not caused by vibration but caused by electric waves etc., since the signal of the vibration monitor 14 is not high, and the data at the measuring point B is excluded from the measurement data. The exclusion level of a noise signal is determined by referring to a value of a statistical error σ of counting rate values. That is, processing sequence is that statistical variation is monitored to the average alpha ray counting rate per unit time, and if the statistical variation exceeds a set statistical variation reference value (this is also called a variance limit level), the measurement data within the unit time is automatically removed. This data processing is performed by, for example, the alpha ray emission amount arithmetic unit 40. Owing to the adoption of this method, it is possible to realize reliable prolonged measurement.

Next, a method of calibrating the relation between the channel (this is also called a peak value) of a pulse height analyzer and the alpha ray energy in a large energy range will be described with reference to FIG. 10. Among decay products of uranium and thorium, the largest alpha ray energy is 8.78 MeV of Po-212. However, common standard alpha ray sources are 5.49 MeV of Am-241, and 4.20 MeV and 4.78 MeV of U-238, and usually, it is not possible to get these standard high-energy alpha ray sources. Therefore, by collecting the natural radon and thoron which are included in air and measuring Po-212 (8.78 MeV), Po-214 (7.69 MeV), and Po-218 (6.00 MeV) of alpha rays which these decay products emit, calibration in the large energy range is performed.

The radon and thoron are collected for a period of time in the order of ten minutes in a basement of a building etc. by using an exhaust pump (this is also called a dust sampler) and a collection filter (this is also called a filter paper). The filter collecting the radon and thoron is set in the super low-level alpha ray measurement apparatus according to this embodiment. When the radon and thoron are measured, the gas replacement does not need to be performed and energy calibration is performed from the time course of alpha ray spectrum of decay products of the radon and thoron that are collected.

Figure 10:
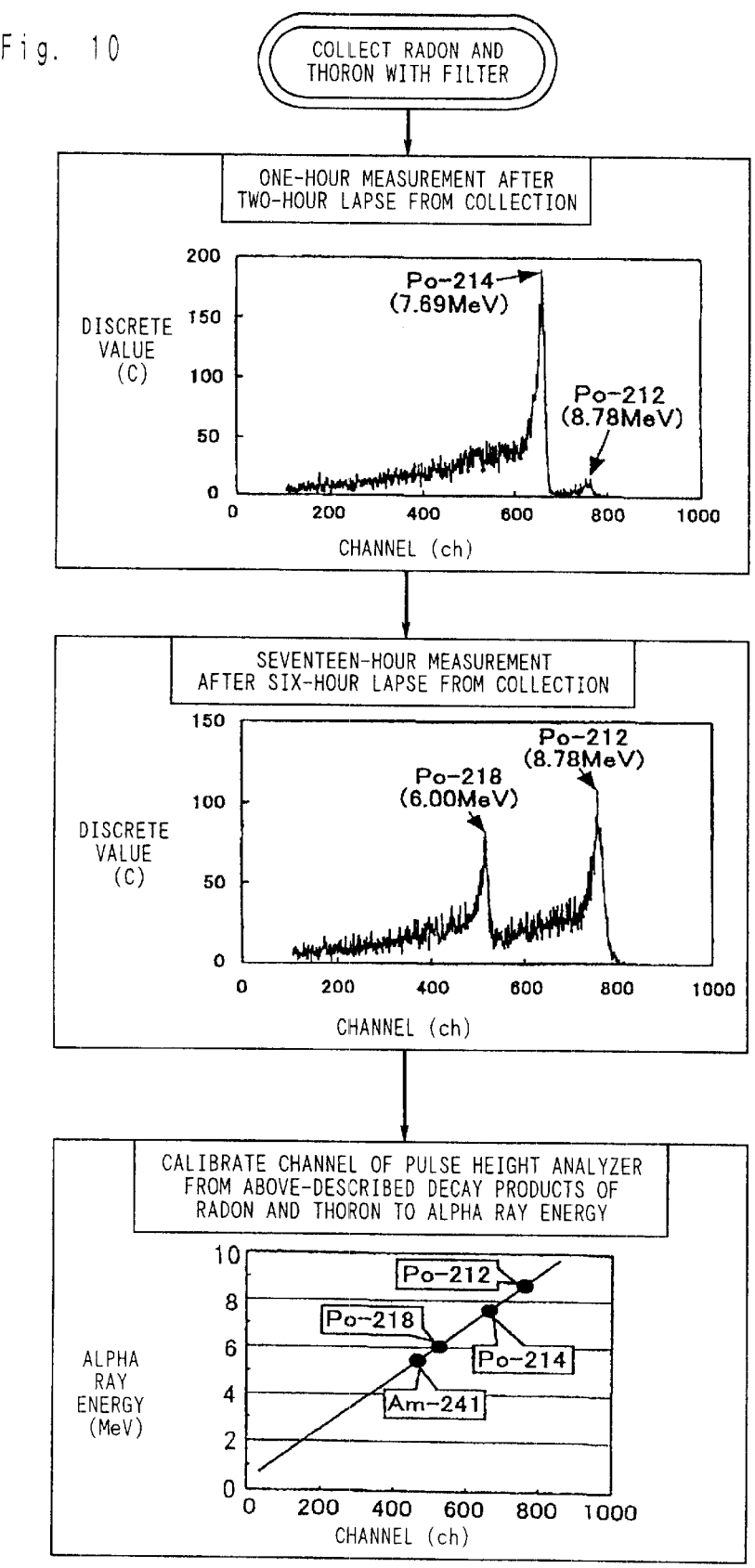
FIG. 10 includes graphs showing a calibration method of the channel of a pulse height analyzer and the alpha ray energy in a wide energy range.

That is, at step 1 in FIG. 10, the collection filter collecting the radon and thoron is set in the super low-level alpha ray measurement apparatus according to this embodiment. In the spectrum in one-hour measurement after two hours have passed from the collection in FIG. 10, Po-214 (7.69 MeV, half-life: 164 $\mu$a) that is a decay product of radon (Rn), is detected notably (step 2). In addition, Po-218 (6.00 MeV, half-life: 3.1 minutes) and Po-212 (8.78 MeV and half-life: 0.3 $\mu$s) that is a decay product of thoron (Tn) are detected notably in the spectrum in 17-hour measurement after six hours have passed from the collection in FIG. 10 (step 3). The relation between the alpha ray energy and the channel of the pulse height analyzer is obtained from the total absorption peak value of these three nuclides and the alpha ray spectrum obtained from Am-241 that is a standard source by using a linear approximation formula (step 4), and energy calibration is performed. It becomes possible to identify a nuclide of an alpha ray in a large energy range from this energy calibration result. In addition, it becomes possible to determine a quantitative region of a nuclide to be measured, and to perform the quantitative analysis of the identified alpha ray.

Figure 11:
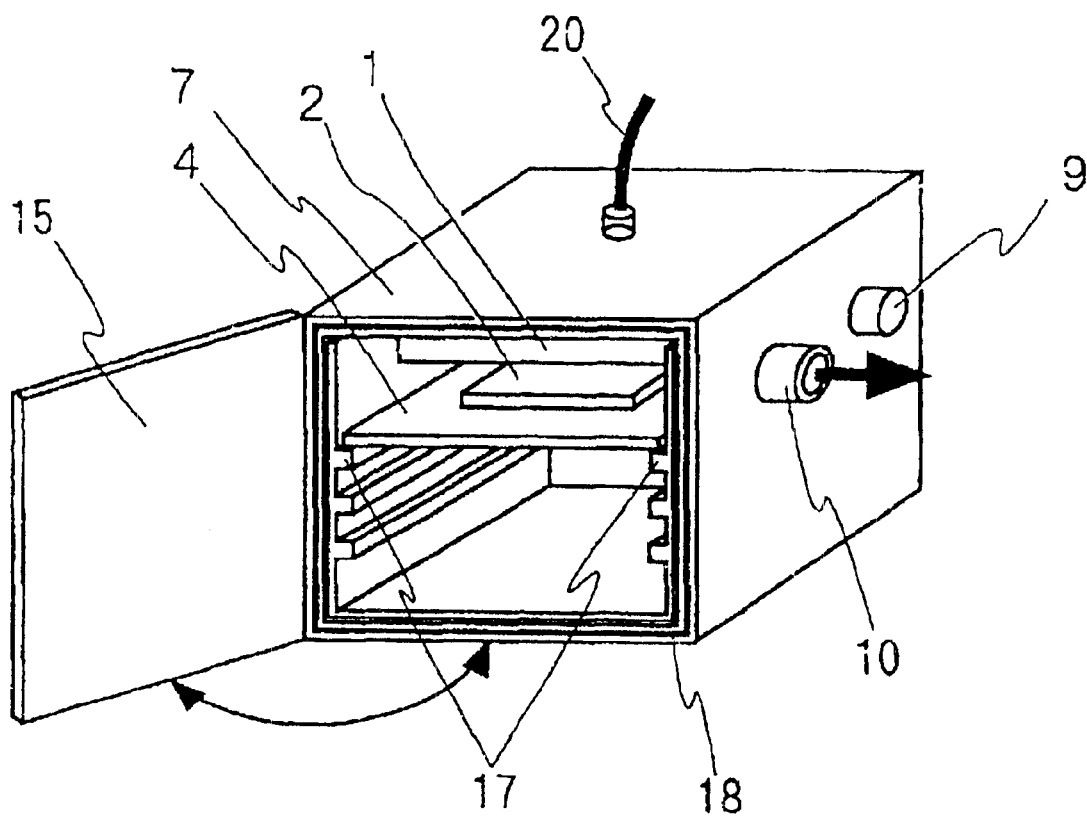
FIG. 11 is a perspective view showing a modified example in the case where a measuring chamber portion of the super low-level alpha ray measurement apparatus according to this embodiment is semi-automated.

FIG. 11 shows a modified example where a measuring chamber portion of the super low-level alpha ray measurement apparatus according to this embodiment is semi-automated. The flat plate-type semiconductor detector 1 that detects a super low-level alpha ray is provided in the upper part of the measuring chamber 7. The signal line 20 of the semiconductor detector 1 is taken out from the upper part of the measuring chamber 7. The sample 2 to be measured is placed on the sample tray 4 inserted into a tray carrier 17 so that the sample 2 is opposed to the semiconductor detector 1 within the measuring chamber 7. The tray carrier 17 has several steps so that the tray carrier 17 can correspond to the thickness of the test sample 2 and adjust the distance from the semiconductor detector 1. This sample tray 4 serves also as a shield wall for shielding the disturbance alpha rays emitted from the lower inner wall of the measuring chamber 7. In addition, the tray carrier 17 is integrated with a plate-like member in the lower rear side and serves also as a shield wall for shielding the disturbance alpha rays emitted from the lower inner wall of the measuring chamber 7.

The exhaust pipe 10 for discharging gases in the measuring chamber 7 and performing measurement under decompression is provided on the side wall of the measuring chamber 7, and is connected to the evacuation apparatus 11 and the gas replacement apparatus 12. In addition, the vacuum level monitor 9 for measuring the degree of vacuum in the measuring chamber 7 is provided. Since contact surfaces of the O-ring 18 and the sealable door 15 are mirror-finished, the amount of leak can be suppressed to a small volume even if a long time passes after evacuation stops.

Figure 12:
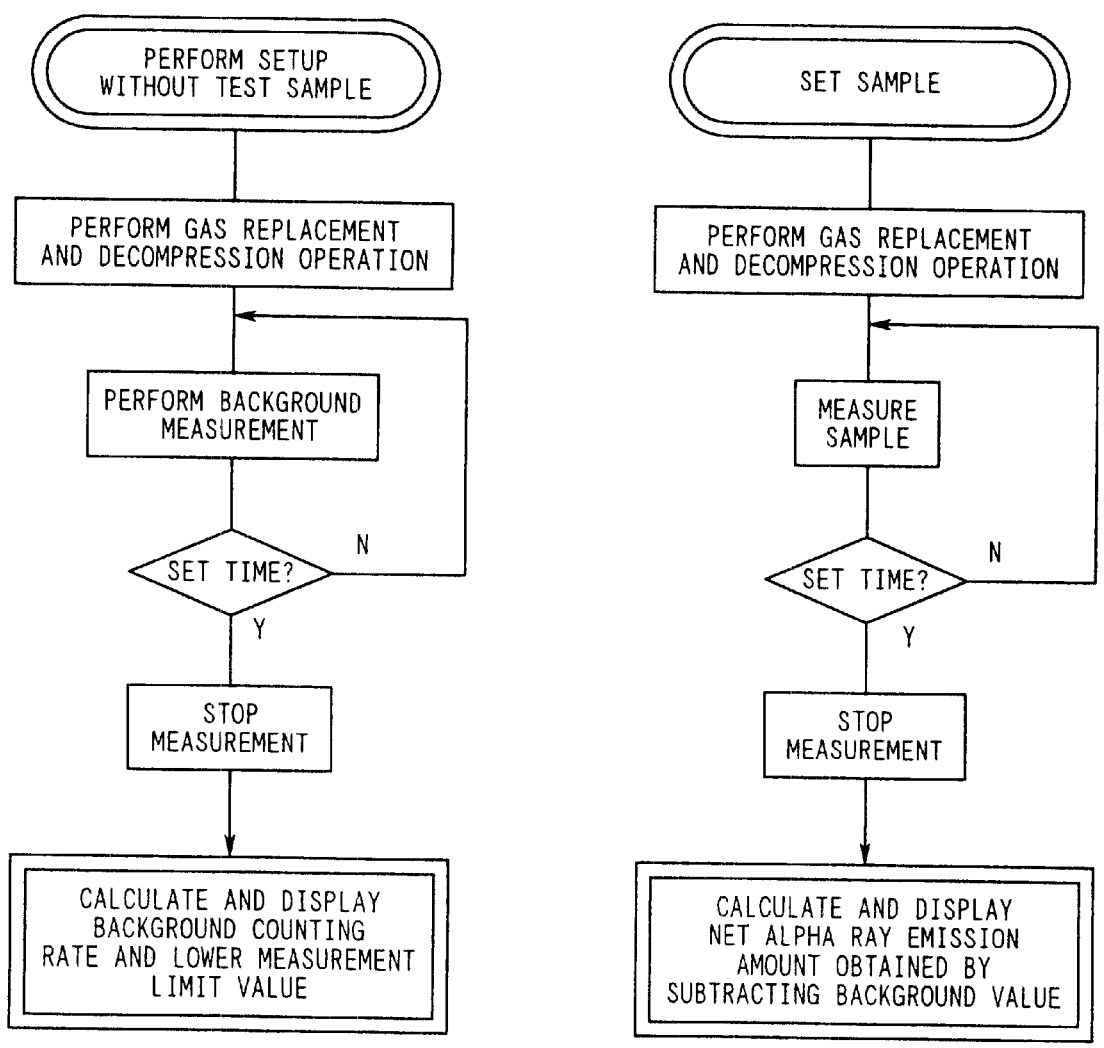
FIG. 12 is a flow chart of super-low level alpha ray measurement that uses a semi-automatic measuring chamber.

Next, a semi-automatic measurement flow of a super-low level alpha ray will be described with reference to FIG. 12. Measurement is performed by two flows, a background measurement and a sample measurement.

First, a background measurement flow will be described. The measuring chamber 7 is opened and the sample tray 4 is set without placing the sample 2. Then, the gas replacement and decompression operation are performed. These gas replacement and decompression operations are performed similar to the measurement flow of the fully automatic operation described in FIG. 4. When the gas replacement is completed and the vacuum level reaches a set value, the process advances to the background measurement. Background measurement time is set so as to satisfy the lower alpha ray measurement limit being the target. A background counting rate and a lower measurement limit are calculated by the alpha ray emission amount arithmetic unit 40 and displayed.

Next, in the sample measurement flow, the measuring chamber 7 is opened and the sample 2 is set on the sample tray 4. Then, the gas replacement and decompression operation are performed. These gas replacement and decompression operations are performed similar to the measurement flow of the fully automatic operation described in FIG. 4. When the gas replacement is completed and the vacuum level reaches a set value, the process advances to the sample measurement. The measuring time of the sample 2 is determined by an alpha ray counting rate from the test sample 2, and time is set. When the set time is reached, the measurement is stopped, an alpha ray emission amount is obtained by the alpha ray emission amount arithmetic unit 40, and the net alpha ray emission amount obtained by subtracting the background value is calculated and displayed.

Since it is necessary to manually set the sample in this method, measurement setup takes time, but since the shield shutter 3 is not necessary, the configuration of the apparatus becomes simple, and hence, it is possible to realize a remarkably low cost apparatus.

Figure 13:
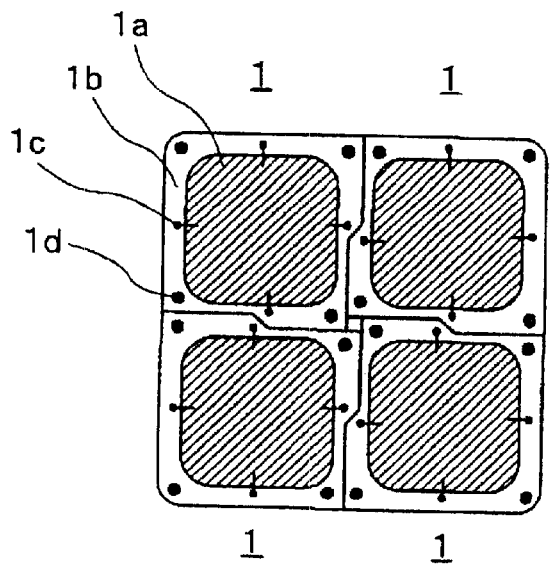
FIG. 13 is a structural diagram showing an example where two or more semiconductor detectors according to this embodiment are arranged.

FIG. 13 shows a modified example where two or more semiconductor detectors 1 of the super low-level alpha ray measurement apparatus according to this embodiment are arranged. The performance (this is also called a lower measurement limit) of this measuring device is improved as the detection area Ad becomes large as seen from formula 1, and hence, it is desirable to enlarge the detection area Ad as much as possible. However, the size of the semiconductor detector 1 is limited by the size of a crystal (this is also called wafer size). Therefore, the semiconductor detector in this embodiment secures the larger detection area Ad by the configuration shown in FIG. 13. Namely, the semiconductor detector 1 comprises a silicon device 1*a* and its substrate 1*b*, an electrode line wire 1*c*, and fixing screws 1*d* on the substrate, and in the example shown in FIG. 13, four pairs of silicon devices and their substrates 1*b* are connected by the fixing screws 1*d* in the substrates and are electrically connected by the electrode line wires 1*c*. It is possible to enhance the detection efficiency of the semiconductor detectors 1 by approximating them as much as possible. If four sheets are arranged as shown in FIG. 13, measuring time is effectively shortened to about one-fourth, and further superlow level measurement can be realized. It becomes possible to enhance the lower measurement limit by enlarging the detection area, for example, increasing the number of sheets to eight sheets, or sixteen sheets according to this method.

Figure 14:
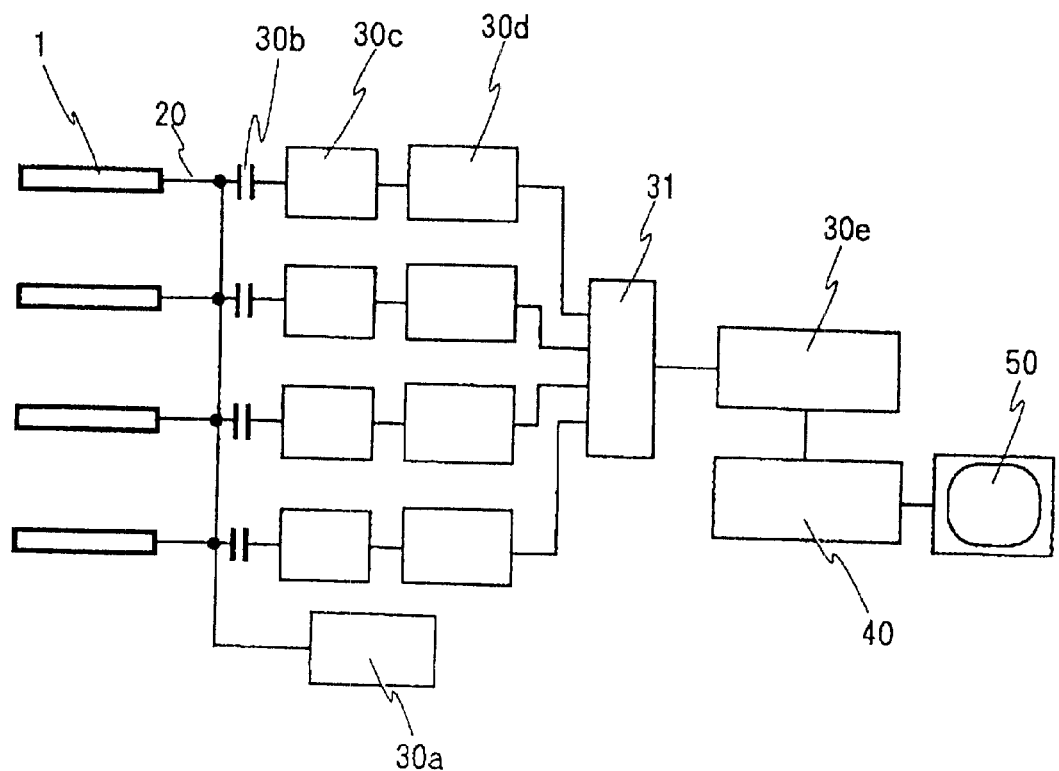
FIG. 14 is a structural diagram of a radiation measuring circuit in a plural sheet array type semiconductor detector.

The configuration of a radiation measuring circuit of this plural sheet array type semiconductor detector will be described with reference to FIG. 14.

In the subsequent stage of the signal line 20 of the semiconductor detector 1 to which a bias voltage is applied by a bias power supply 30*a*, a coupling capacitor 30*b* for reliable charge collection, a preamplifier 30*c*, and a linear amplifiers 30*d* for pulse shaping matching for pulse height analysis are provided. These are provided to four semiconductor detectors 1, respectively, and signals of respective linear amplifiers are added by an adding amplifier 31 to be measured by a pulse height analyzer 30*e* subsequent to the adding amplifier 31. Alpha rays in an energy range, which is an object range, from the result of the pulse height analysis is identified, the quantitative analysis of the alpha ray emission amount is performed by the alpha ray emission amount arithmetic unit 40, and its result is displayed on the display unit 50.

Although the above explanation is described for the measurement of an alpha ray, the same measurement is possible also for charged particles such as beta rays.

As described above, according to this embodiment, it is possible to provide a charged particle measuring device with high sensitivity that can efficiently measure a super-low level of charged particle, which has been impossible up to now, while performing the nuclide identification of the super-low level of charged particle.

According to this invention, it is possible to provide a charged particle measuring device with high performance that can efficiently measure a super-low level of charged particle.

What is claimed is:

1. A charged particle measuring device comprising a measuring chamber having a sealable door which can be opened and closed, the measuring chamber comprising: a semiconductor detector; a radiation measuring circuit including a sample tray on which a sample is placed so as to oppose to the semiconductor detector, a preamplifier, a linear amplifier, and a pulse height analyzer connected to the semiconductor detector; a charged particle emission amount arithmetic unit for performing quantitative analysis of charged particles with an output signal from the radiation measuring circuit; a display unit for displaying analysis result of the charged particle emission amount arithmetic unit; an evacuation pipe line for exhausting air to the measuring chamber; and a pure gas supply pipe line for supplying the pure gas for replacement.

2. The charged particle measuring device according to claim 1, wherein a vacuum level monitor is provided in the measuring chamber or an evacuation pipe line, and wherein the device starts remeasurement, after automatically removing measurement data during the time when the degree of vacuum detected by the vacuum level monitor exceeds a variance limit level, and after performing evacuation of the inside of the measuring chamber and then performing supply and replacement of a pure gas.

3. The charged particle measuring device according to claim 2, wherein the charged particle measuring device includes a vibration monitor for monitoring vibration of the measuring chamber, and automatically removes measurement data during the time when the degree of vacuum detected by the vacuum level monitor exceeds a variance limit level.

4. The charged particle measuring device according to claim 1, wherein the charged particle emission amount arithmetic unit performs statistical variation monitoring to an average charged particle counting rate per unit time, and further includes a processing sequence of automatically removing measurement data within the unit time when the average charged particle counting rate exceeds a statistical variation reference value that is set.

5. The charged particle measuring device according to claim 1, wherein a shield wall shielding disturbance charged particles incident from surfaces other than those of the sample is provided around the semiconductor detector in the measurement container, and an outer wall of the measuring chamber is further surrounded with a shielding material.

6. The charged particle measuring device according to claim 5, wherein the shielding material is lead.

7. The charged particle measuring device according to claim 1, wherein the semiconductor detector is formed by connecting a plurality of silicon devices and substrates of the silicon devices with fixing screws, and wiring them with electrode line wires, and the preamplifier and the linear amplifier are connected to each silicon device individually, and an adder adding output signals of the respective linear amplifiers, and a pulse height analyzer connected to the adder are provided.

8. The charged particle measuring device according to claim 1, wherein the charged particles form an alpha ray.

9. A charged particle measuring device comprising a measuring chamber, the measuring chamber comprising: a semiconductor detector; a sample placed so as to oppose to the semiconductor detector; a radiation measuring circuit which includes a shield shutter that is arranged between the semiconductor detector and the sample and shields charged particles incident from the sample during background measurement, and is connected to the semiconductor detector to perform a spectrum analysis; a charged particle emission amount measuring device which performs quantitative analysis of charged particles with an output signal of the radiation measuring circuit; a display unit for displaying analysis result of the charged particle emission amount measuring device; and an evacuation apparatus and a gas replacement apparatus, which are connected through an exhaust pipe communicating with the inside of the measuring chamber.

10. The charged particle measuring device according to claim 9, wherein a vacuum level monitor is provided in the measuring chamber or an evacuation pipe line, and wherein the device starts remeasurement, after automatically removing measurement data during the time when the degree of vacuum detected by the vacuum level monitor exceeds a variance limit level, and after performing evacuation of the inside of the measuring chamber and then performing supply and replacement of a pure gas.

11. The charged particle measuring device according to claim 10, wherein the charged particle measuring device includes a vibration monitor for monitoring vibration of the measuring chamber, and automatically removes measurement data during the time when the degree of vacuum detected by the vacuum level monitor exceeds a variance limit level.

12. The charged particle measuring device according to claim 9, wherein the charged particle emission amount arithmetic device performs statistical variation monitoring to an average charged particle counting rate per unit time, and further includes a processing sequence of automatically removing measurement data within the unit time when the average charged particle counting rate exceeds a statistical variation reference value that is set.

13. The charged particle measuring device according to claim 9, wherein a shield wall shielding disturbance charged particles incident from surfaces other than those of the sample is provided around a semiconductor detector in a measurement container, and an outer wall of the measuring chamber is further surrounded with a shielding material.

14. The charged particle measuring device according to claim 13, wherein the shielding material is lead.

15. The charged particle measuring device according to claim 9, wherein the semiconductor detector is formed by connecting a plurality of silicon devices and substrates of the silicon devices with fixing screws, and wiring them with electrode line wires, an the preamplifier and the linear amplifier are connected to each silicon device individually, and an adder adding output signals of the respective linear amplifiers, and a pulse height analyzer connected to the adder are provided.

16. A charged particle measuring method comprising the steps of: arranging a sample tray for placing a sample so as to oppose to a semiconductor detector in a measuring chamber having a sealable door which can be opened and closed; performing several times of cycle purge with a pure gas by an evacuation apparatus and a gas replacement apparatus which are connected through an exhaust pipe which communicates with the inside of the measuring chamber; measuring a charged particle emission amount to set as a background measurement using a radiation measuring circuit which includes a preamplifier, a linear amplifier, and a pulse height analyzer that are connected to the semiconductor detector, and a charged particle emission amount arithmetic unit for performing quantitative analysis of charged particle with an output signal from the radiation measuring circuit; and calculating a charged particle emission amount value which is obtained by subtracting the background measurement from the charged particle emission amount measurement obtained by measuring a charged particle emission amount after placing the sample on the sample tray and performing several times of cycle purge with a pure gas.

17. The charged particle measuring method according to claim 16, including a sequence where measurement data acquisition of the charged particle emission amount is started from a point of time when a set time elapses after completing the cycle purge with a pure gas.

18. The charged particle measuring method according to claim 16, wherein the charged particles form an alpha ray, and the energy of the alpha ray to be measured is calibrated with measurement data of the alpha ray emitted by a decay product that is measured using natural radon and thoron being collected.

19. The charged particle measuring method according to claim 13, 16, wherein the charged particles form an alpha ray.

20. A charged particle measuring method comprising the steps of: arranging a sample so as to oppose to a semiconductor detector in a measuring chamber; shielding charged particles incident from the sample by a shield shutter between the semiconductor detector and the sample, performing several times of cycle purge with a pure gas by an evacuation apparatus and a gas replacement apparatus which are connected through an exhaust pipe which communicates with the inside of the measuring chamber; measuring a charged particle emission amount and setting the same as background measurement value using a radiation measuring circuit which is connected with the semiconductor detector and performs spectrum analysis, and a charged particle emission amount measuring device which performs quantitative analysis of charged particles with an output signal of the radiation measuring circuit; and calculating a charged particle emission amount value which is obtained by subtracting the background measurement from the charged particle emission amount measurement obtained by measuring a charged particle emission amount, incident from the test sample, by opening the shield shutter.

21. The charged particle measuring method according to claim 20, including a sequence where measurement data acquisition of the charged particle emission amount is started from a point of time when a set time elapses after completing the cycle purge with a pure gas.

22. The charged particle measuring method according to claim 20, wherein the charged particles form an alpha ray, and the energy of the alpha ray to be measured is calibrated with measurement data of the alpha ray emitted by a decay product that is measured using natural radon and thoron being collected.

* * * * *